United States Patent [19]

Carlini

[11] 3,793,517

[45] Feb. 19, 1974

[54] LIGHTING DEVICE FOR A HELMET OR THE LIKE

[76] Inventor: Anthony M. Carlini, 24340 Cherry Hill Rd., Dearborn, Mich. 48124

[22] Filed: Sept. 20, 1971

[21] Appl. No.: 181,851

[52] U.S. Cl............ 240/60, 240/6.4 W, 240/10.65, 240/106.1
[51] Int. Cl................................................ A42b 1/24
[58] Field of Search. 240/6.4 W, 60, 59, 2 R, 106.1, 240/10.65

[56] References Cited
UNITED STATES PATENTS

| | | | |
|---|---|---|---|
| 3,032,647 | 5/1962 | Wansky et al. | 240/10.65 |
| 2,473,394 | 6/1949 | Scott | 240/60 X |
| 3,309,691 | 3/1967 | Bonanno | 240/60 X |
| 3,237,004 | 2/1966 | Abolins | 240/106.1 X |
| 2,203,028 | 6/1960 | Parrillo | 240/60 |

*Primary Examiner*—Samuel S. Matthews
*Assistant Examiner*—E. M. Bero
*Attorney, Agent, or Firm*—Hauke, Gifford, Patalidis & Dumont

[57] ABSTRACT

A safety helmet for an operator of a motorcycle or the like having a lighting device with a self contained light projecting means disposed within a housing carried on the top portion of the helmet. The housing is of a substantially triangular shape forming a streamline contour with a lens disposed at the rear end of the housing to direct light rearwardly of the helmet body. The lighting device housing has a bottom contour complementary to the shape of the helmet and may be attached thereto by suitable fasteners or may be formed integrally with the helmet body. Radially extending lenses strategically located on the housing of the lighting device direct light from the sides and front portion thereof.

12 Claims, 7 Drawing Figures

PATENTED FEB 19 1974

INVENTOR
ANTHONY M. CARLINI
BY
Hauke Gifford & Patalidis
Attorneys

INVENTOR
ANTHONY M. CARLINI
BY
Hauke Gifford & Patalidis
Attorneys

LIGHTING DEVICE FOR A HELMET OR THE LIKE

BACKGROUND OF THE INVENTION

1. Field Of The Invention

The present invention pertains to a lighting device for a safety helmet and particularly to a lighting device for a motorcycle helmet or the like.

2. Description Of The Prior Art

Heretofore, lighting devices have been adapted for use with helmets or the like, but all of these devices have been mounted on the outer surface of the helmet forming a broken or highly irregular contour. Because of this irregular contour, these helmets are not useful as motorcycle helmets, as they are very likely to be torn from the helmet when the motorcyclist travels at high speeds. Further, such lighting devices inhibit the driver's ability to move his head from side to side as the force of the wind acting on such irregular contours is substantial.

Also, certain lighting devices which have been used in the past have energizing means for the light source that are mounted exteriorly of the helmet and require wires and the like to transmit the power from the energizing means to the light source. These wires are not only a great handicap to persons who are wearing the helmet and attempting to drive a motorcycle, they are also greatly detrimental to the sales potential of such helmets.

Other lighting devices have energizing means such as batteries that are mounted within the helmet, however, such a construction is dangerous to the motorcyclist as the batteries will act as projectiles if the motorcyclist is involved in a sudden collision, thus possibly causing serious injury.

SUMMARY OF THE INVENTION

The present invention, which will be subsequently described in greater detail, comprises a lighting device adapted to be mounted on a motorcycle helmet of the type constructed of rigid material, the outer surface of which forms a substantially curved contour. The lighting device comprises a housing having a smooth streamline curved outer surface which is tapered from the rear light conducting end to the front end and forms a substantially triangularly shaped housing body. A switch mounted on the exterior surface of the housing connects a battery contained within the housing to an electric light bulb, which in turn, directs light through a lens in a rearwardly direction of the helmet. In the preferred embodiment, the lower surface of the housing has a curved contour generally complementary to the curve contour of the helmet body, and is further provided with means for attaching the housing to the outer surface of the helmet in such a manner that the lower curved surface of the housing is elevated above the helmet so as to minimize the effects of air turbulence. In a second embodiment, the housing is integrally formed with the helmet.

It is therefore an object of the present invention to provide a new and improved lighting device for motorcycle helmets and the like.

It is also an object of this invention to provide a lighting device for a motorcycle helmet which is not only highly functional but which is attractive to the viewer and which provides an added safety factor for the user.

Other objects, advantages, and applications of the present invention will become apparent to those skilled in the art when the accompanying description of some examples of the best modes contemplated for practicing the invention is read in conjunction with the accompanying drawings.

BRIEF DESCRIPTION OF THE DRAWINGS

The description herein refers to the accompanying drawings wherein like reference numerals refer to like parts and in which.

DESCRIPTION OF THE PREFERRED EMBODIMENT

Figure 1:
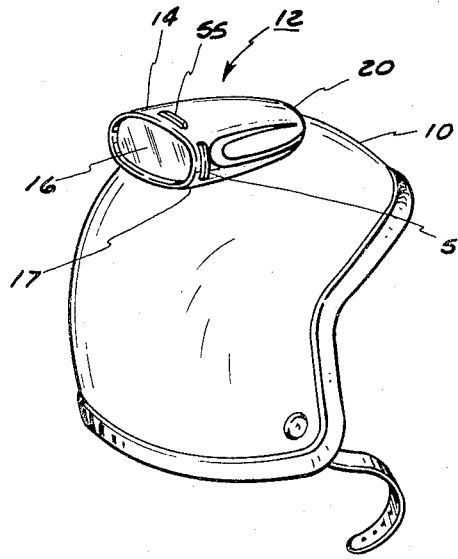
FIG. 1 is a perspective view of a preferred embodiment of the present invention in the form of a lighting device attached to a helmet.
Figure 2:
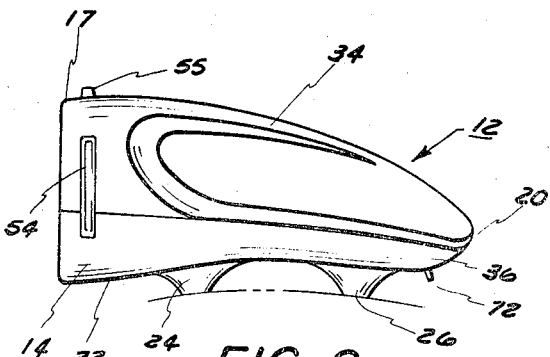
FIG. 2 is a view in side elevation of the lighting device illustrated in FIG. 1.
Figure 3:
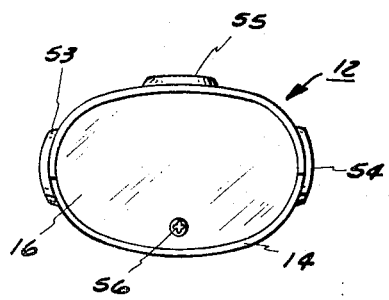
FIG. 3 is a view in rear elevation of the lighting device illustrated in FIG. 1.

Referring to the drawings and especially FIG. 1, the numeral 10 generauy designates a helmet completely constructed of a rigid material, such as plastic, that is capable of withstanding high impacts to protect the user thereof. The helmet 10 comprises a concavely shaped body which is os contoured as to fit the head of a user, however it may be somewhat larger than the head when provided with an inner floating network of straps or the like for spacing the helmet from the head to enhacne the protection which the helmet affords and to make it mwre comfortable to the user.

A lighting device 12 is carried toward the rear of the top portion of the helmet 10 and comprises a housing 14 formed from any suitable material such as plastic or the like. A translucent plastic lens 16 disposed in the rear portion 17 of the housing 14 is so positioned that light generated by an electric light bulb 18, when illuminated, will be readily visible at night. The lighting device 12 is so mounted on the helmet 10 that the light passing through plastic lens 16 is directed rearwardly of the helmet 10 so that the wearer thereof may be easily seen from the rear during night use.

The housing 14 of the lighting device 12 has a smooth generally surface and when viewed from the side and top elevations it has a substantially triangularly shaped contour. The substantial so enhance more triangularly shaped contour is formed by tapering the housing 14 inwardly from the rear lens carrying portion 17 toward the front end 20 thereof. The lower surface 22 of the housing 14 has a curved contour which is generally complementary to the curved contour of the helmet 10 to provide for a proper mating between the two surfaces. In the preferred embodiment, a pair of legs 24 and 26 extend from the lower surface 22 of the housing 14 a sufficient distance so as to elevate the lighting device 12 above the outer surface of the helmet 10 when the legs 24 and 26 abut the same. As will be seen hereinafter, the legs 24 and 26 permit the adaptation of the lighting device 12 to a variety of helmet shapes and contours.

Figure 5:
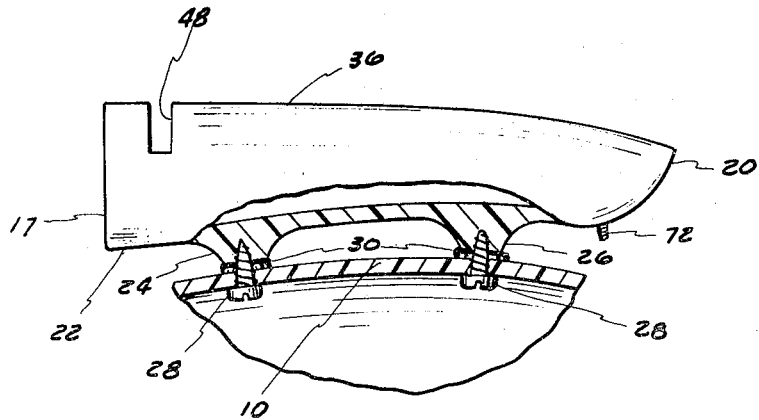
FIG. 5 is a fragmentary sectional view in side elevation illustrating one preferred method of attaching the lighting device of the present invention to a helmet.

Referring to FIG. 5, it can be seen that the lighting device 12 may be attached to the outer surface of the helmet 10 by means of a plurality of screws 28 which extend through the helmet outer surface and into the legs 24 and 26 to secure the lighting device thereto. Inserts 30 of a flexible material such as rubber are disposed intermediate the outer surface of the helmet 10 and the bottom of the legs 24 and 26 so as to permit the adaptation of the legs to the various shapes and contours that such helmets may take as it is a customary practice in the helmet making industry to make helmets having varied contours so that the same may fit a wide range of head sizes.

Figure 6:
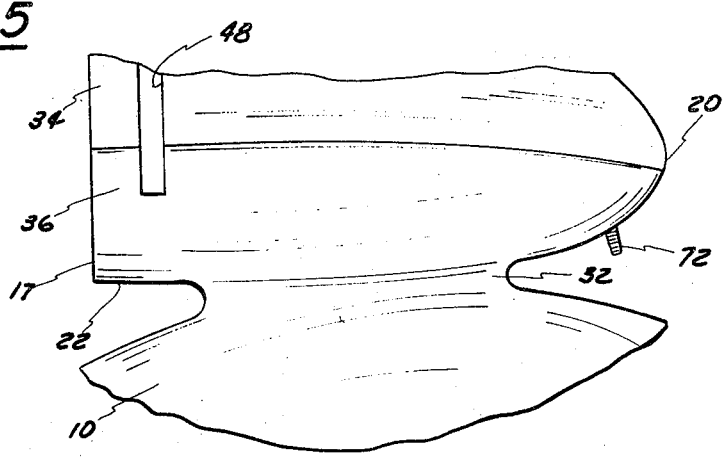
FIG. 6 is a fragmentary sectional view in side elevation showing a second preferred method of attaching the light device of the present invention to a helmet.

FIG. 6 illustrates a second method for attaching the lighting device 12 to the helmet 10 wherein the lower surface 22 of the lighting device 12 is joined integrally to the outer surface of the helmet 10. Such an integral joining of the lower surface 22 with the helmet 10 may be accomplished by several methods. An intermediate portion 32 may be joined to both the outer surface of the helmet 10 and the lower surface 22 of the lighting device 10 by any suitable adhesive. A second method of integrally joining the lighting device 12 and the outer surface of the helmet may take the form of molding a lower portion 36 of the housing 14 with the helmet 10 as a single unit when the same are fabricated.

Figure 4:
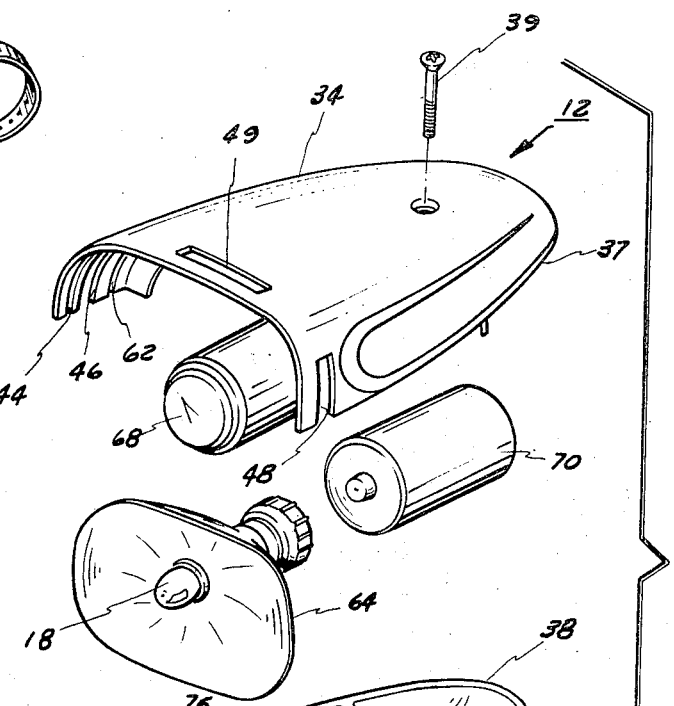
FIG. 4 is an enlarged exploded perspective view of the lighting device illustrated in FIG. 1.
Figure 4:
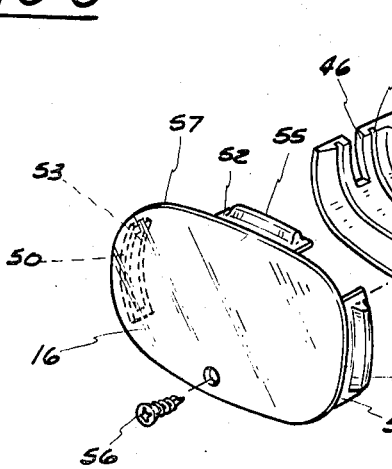

Referring now to FIG. 4 for a detailed description of the housing 14 of the lighting device 12 and the components contained therein, the housing 14 comprises an upper portion 34 and the lower portion 36 respectively having mating edges 37 and 38. The upper and lower portions 34 and 36, which will be respectively referred to hereinafter as the cover 34 and the base 36, are secured to each other by a threaded screw 39. The cover 34 and the base 36 are both provided with an annular recess 44 and side slots 46 and 48, all of which mate respectively with one another when edges 37 and 38 respectively of the cover and base are brought together. The cover 34 is further provided with a top slot 49. The translucent plastic lens 16 is provided with three extending flange sections 50, 51 and 52, respectively located on opposite sides and top portion thereof, each of which respectively forms radially extending lens 53, 54 and 55 that are adapted to respectively engage the slotted portions 46, 48 and 49 when the outer peripheral edge 57 of the lens 16 is positioned within the recess 44. The extending flange sections 50, 51 and 52, give support to the rigidity of the lens 16 and the base and cover sections when the same are brought together. The radially extending lens 52, 54 and 55 are of a translucent plastic material adapted to transmit light externally of the housing when the electric bulb 18 is illuminated. The radially extending lenses each have a greater thickness than the housing 14 and are thus adapted to extend beyond the outer surfaces of the housing 14 so as to be easily seen when iluminated.

In the preferred embodiment, the plastic lens 16 is colored red and the radially extending lenses 53, 54 and 55 are each yellow as it is customary in vehicles and the like that the rearward directed light be red and side and front lights be yellow. A threaded screw 56 extends through the lens 16 and engages the base 36 to further insure that the lens 16 is securely retained therein, however, its use is optional.

An annular recess 62 formed in both the cover 34 and the base 36 is adapted to securely retain a reflector element 64. The reflector element 64, in addition to providing a mounting means for the electric bulb 18, acts in the conventional manner to direct the light generated by the electric bulb 18 through lens 16 in a rearward direction of the helmet 10 and through the radially extending lens 53, 54 and 55 so that light is simultaneously directed through all four lenses.

A pair of batteries 68 and 70, which may be conventional dry cell batteries, are positioned in a side by side relationship behind the reflector element 64 and so arranged that the positive terminals face in opposite directions. Electric light bulb 18 is the type commercially available and provides a light source when energized by connecting the same to the batteries 68 and 70 through any suitable switching means such as power on-off switch 72. The power on-off switch 72 is connected to the lower front portion of the base 36 by a plurality of screws 74 which extend through the switch 72 and into threaded holes, not shown, disposed on the lower side of the base 36. Suitable wiring connects the switch and the batteries to the bulb. The wiring may take the form of the conventional copper wire or metal strips such as indicated at 75 so positioned within the base 36 as to provide proper electrical connections in the manner well known in the art.

Figure 7:
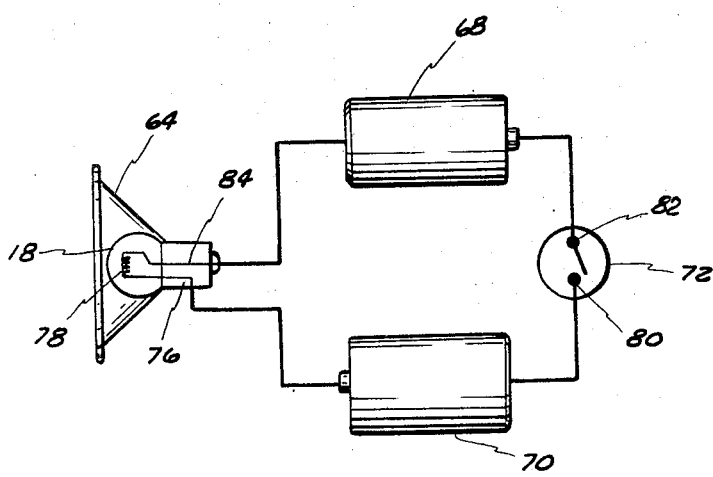
FIG. 7 is a schematic diagram of a preferred electrical circuitry used in the lighting device of the present invention.

Referring to FIG. 7 for a schematic diagram of a suitable electrical circuit, one lead 76 of a filament 78 of the electric light bulb 18 is connected to the positive terminal of the battery 70. The opposite terminal of the battery 70 is connected to a stationary contact 80 of the power on-off switch 72. Stationary contact 80 is adapted to be engaged by a movable contact 82 so as to open and close the circuit when it is desired to illuminate the lighting device 12. Movable contact 82 is in turn connected to the positive terminal of the battery 68 and the negative terminal of the battery 68 is connected to the lead 84 of the filament 78 thus completing the electrical circuit.

It can thus be seen that the present invention provides a lighting device adapted to be carried toward the rear of the top portion of a helmet and attached thereto either by a plurality of screws, or integrally joined therewith by a suitable adhesive or by being fabricated as one unit.

It can also be seen that the present invention has provided a lighting device adapted to be carried on a helmet to project light rearwardly of the helmet, and which is so carried by the helmet as to form a streamline path for the passage of air so as not to generate forces which interfere with the movement of the user's head when he is traveling at a high speed.

It can also be appreciated that the present invention provides a lighting device adapted for use on a helmet, the device having a streamline housing which prevents wind forces from shearing the device from the helmet.

Having thus described the invention, what is claimed is as follows:

1. In combination, a safety helmet for an exposed rider of a vehicle and a safety lamp secured to an upper outer surface thereof, said lamp comprising, a substantially smoothly streamlined casing, a lens carried by said casing, said lens being substantially vertical and facing rearwardly with respect to said rider, said casing being streamlined and extending from said lens forwardly and tapering toward an apex, said casing having slots disposed adjacent the rearward portion thereof and said lens having portions of light transmitting material extending through said slots.

2. The combination as defined in claim 1 wherein said casing is in two parts divided along a horizontal plane and encloses a battery, a light bulb, a reflector to direct light from said bulb through said lens, and electrical circuitry connecting said battery and bulb.

3. The combination as defined in claim 1 wherein said casing has a pair of longitudinally spaced peripheral inner grooves near its rear end, said lens and said reflector each having peripheral edges supportably engaged respectively in said grooves.

4. The combination as defined in claim 1 wherein at least one of said casing parts has a vertical strenghening partition therein separating said battery from said reflector and bulb.

5. The combination as defined in claim 1 and including a switch carried for exterior manipulation adjacent the forward end of said casing and operative to open and close said circuitry.

6. In combination an exposed vehicle rider safety helmet comprising a body formed with a substantially smoothly curved outer surface contour and a housing enclosing and carrying a light projecting means, said housing being carried on and secured to said helmet outer upper surface generally toward the rear thereof with respect to said vehicle rider, said light projecting means being arranged to project light in a rearwardly direction from said housing, said housing having a smooth outer surface joined to said helmet surface in such a manner that said housing and helmet surfaces define a streamline path for passage of air thereby, said housing including a rearwardly faced lens, said housing being substantially triangular as viewed from the side and top elevations thereof, said lens defining the base side of such triangle and the apex thereof facing forwardly, said light projecting means including electric light bulb and a battery mounted within and peripherally enclosed by said housing; an electrical circuit connecting said bulb and battery; switching means mounted exteriorly on said housing for operatively opening and closing said circuit and a reflector associated with said light bulb to direct its light through said lens, said housing having slots formed in the lateral side and top portions thereof, said lens having portions extending through said slots in said housing so as to project light from said bulb laterally outwardly of said housing; and said reflector being arranged to direct light from said bulb through the portions of said lens extending through said slots.

7. The combination as defined in claim 6 including means for attaching said housing to said helmet outer surface and spacing said housing from said helmet.

8. The combination as defined in claim 6 including a foot element integrally joining the lower surface of said housing to said helmet outer upper surface.

9. In combination, a safety helmet for an exposed rider of a vehicle and a safety lamp secured to an upper outer surface thereof said lamp comprising a housing having at least one substantially vertical lens facing rearwardly with respect to said rider and a substantially smoothly streamlined casing extending from said lens longitudinally forwardly and tapering toward an apex, said casing being divided into two parts along a horizontal plane and being constructed of high impact resisting plastic material; one of said casing parts having a vertical strenghening partition, a battery carried in said casing on one side of said partition and a reflector and bulb carried on the other side of said partition.

10. The combination as defined in claim 9 wherein said lamp is mounted on said helmet generally toward the rear thereof.

11. The combination as defined in claim 9 wherein said casing has a lower surface contoured generally complementary to the contour of that portion of said helmet to which it is secured.

12. The combination as defined in claim 11 wherein said casing is elevated above the helmet upper outer surface.

* * * * *

UNITED STATES PATENT OFFICE
CERTIFICATE OF CORRECTION

Patent No. 3,793,517          Dated Feb. 19, 1974

Inventor(s) Anthony M. Carlini

It is certified that error appears in the above-identified patent and that said Letters Patent are hereby corrected as shown below:

Column 2, line 35, delete "generauy" and insert --generally--;

line 39, delete "os" and insert --so--;

line 43, delete "enhacne" and insert --enhance--;

line 44, delete "mwre" and insert --more--;

line 57, delete "generally" and insert --outer--;

line 60, delete "so enhance more".

Column 3, line 63, delete "iluminated" and insert --illuminated--;

Column 6, line 29, delete "strenghening" and insert --strengthening--.

Signed and sealed this 6th day of August 1974.

(SEAL)
Attest:

McCOY M. GIBSON, JR.          C. MARSHALL DANN
Attesting Officer             Commissioner of Patents